United States Patent [19]

Bremner

[11] 3,789,193

[45] Jan. 29, 1974

[54] PRICE SETTING KEYS AND METHOD OF TRANSFERRING PRICE TO PRINTER

[75] Inventor: David F. Bremner, Bellbrook, Ohio

[73] Assignee: The National Cash Register Company, Dayton, Ohio

[22] Filed: Jan. 7, 1972

[21] Appl. No.: 216,108

[52] U.S. Cl......... 235/61.11 R, 177/4, 235/61.12 N, 235/61.11 D, 235/61.11 E

[51] Int. Cl......................... G06k 7/00, G06k 19/00

[58] Field of Search... 235/92 WT, 92 AC, 61.11 D, 235/61.11 E, 61.11 B, 61.12 N, 151.33; 177/4; 340/146.3 Z

[56] References Cited

UNITED STATES PATENTS

| | | | |
|---|---|---|---|
| 3,626,160 | 12/1971 | Hagopian | 235/61.11 D |
| 3,634,656 | 1/1972 | Krechmer et al. | 235/61.11 D |
| 3,665,163 | 5/1972 | Mast et al. | 235/61.11 D |
| 3,508,227 | 4/1970 | Berezin et al. | 235/61.11 D |
| 3,419,710 | 12/1968 | Mathews et al. | 235/61.11 D |
| R25,897 | 11/1965 | Bell | 177/4 |
| 3,459,272 | 8/1969 | Susor | 177/4 |
| 3,005,106 | 10/1961 | Wilkins | 340/146.3 Z |
| 3,649,814 | 3/1972 | Spanjersberg | 235/61.11 E |

OTHER PUBLICATIONS

A. C. Thorpe, Machine Readable Key, IBM Technical Disclosure Bulletin, Vol. 10, No. 12, May 1968, page 1830.

J. Svigals, Credit Card Design, IBM Technical Disclosure Bulletin, Vol. 9, No. 3, August 1966, page 314.

*Primary Examiner*—Paul J. Henon
*Assistant Examiner*—Joseph M. Thesz, Jr.
*Attorney, Agent, or Firm*—J. T. Cavender; Wilbert Hawk, Jr.; George J. Muckenthaler

[57] ABSTRACT

A programmable automatic price setting key for use with a reader to transfer the price to a computer controlled printer for printing the proper base multiple of a commodity. A plurality of price setting tabs have slots therein for insertion on the key, the tabs including two rows of holes, one for clock-pulse generation and the other for supplying coded data. The reader unit incorporates a slot for the key and includes a light source and diffusing lens system along with a slide head with photodiodes positioned to pass over the rows of holes and thereby generate a series of pulses in binary code, corresponding to human readable characters on the key tabs, for transfer of the code to the computer.

24 Claims, 14 Drawing Figures

PRICE SETTING KEYS AND METHOD OF TRANSFERRING PRICE TO PRINTER

BACKGROUND OF THE INVENTION

In recent years, the commodity insert key has become widely used in the system for printing the names and prices of various commodities on labels for preweighed and pre-packaged products. Especially is this true in the supermarkets wherein packaging of meats and produce is computer controlled at one plant and the packaged product is then shipped to the various markets for sale. It is, of course, desirable to print and attach the proper label on each individual package in a fast operation such as one that is computer oriented and controlled.

The labels on these packages usually contain the type and grade of the commodity, the net weight in pounds, the price per pound, and the price of the item. The type and grade of the commodity are generally predetermined, and the net weight and the price of the package are determined by a computing weighing scale when the price per pound is made available to it. Usually a number of the commodity insert or price setting keys are stored in a rack so that any one of these keys is readily available for insertion into the system, be the purpose for, inter alia, a change in price of a particular commodity or for the price per pound of a different commodity or grade thereof.

One manner of setting up selected price factors in computing weighing scales has been the use of manually operated selector switches wherein a bi-sectional plate or clip is inserted into the recording and computing means, the plate including pins for operating the switches, as shown and described in U. S. Pat. No. Re. 25,897, issued on the application of R. E. Bell.

Further prior art is taught in U. S. Pat. No. 3,308,756, issued on the application of E. C. Karp, which shows and describes a replaceable printing type slug member having a printing section, a handle section, and stop means for properly positioning the slug in a printing mechanism.

Additionally, a condition responsive apparatus is shown and described in U. S. Pat. No. 3,459,272, on the application of W. C. Susor, wherein an automatic computing weighing scale has printing plates for printing commodity names and for activating photosensitive means by permitting light to fall on such means in accordance with unit prices of the commodities, there being masks provided for clipping over appropriate holes in the printing plate to give the desired price. The computer has a weight input compatible with a parallel binary coded decimal output of an electrical readout in the circuit.

While there have been various ways and means of providing automatic price setting capability for a computing weighing operation, it is desired to attain certain improvements over the prior art.

SUMMARY OF THE INVENTION

The present invention relates to computing weighing operations and more particularly to programmable automatic price setting keys and means for transferring prices to a computer-controlled printer. The price setting or insert keys include a handle portion and a read portion wherein a plurality of selected price setting tabs are slidable over the read portion and locked in place.

The price setting tabs include human readable characters on one surface and they have two rows of holes in a section adjacent or along one side of the character surface, one row being for clock-pulse generation and the other row being for the supplying of coded data to the computer. The presence or the absence of holes in the coded area of the price setting tabs is determined by the decimal code in the 1, 2, 4, or 8 binary output corresponding to the numerals represented on the particular tabs.

A reader unit having a light source and a diffusing lens system carries a slide head with a pair of photodiodes positioned to pass over the holes in the price setting tabs and thereby generate a series of pulses that are amplified into the computer-controller for the printing operation. The selected insert key is placed into a keyed slot in the reader and the slide head is moved across the tabs, initiating actuation of a switch at one end for starting or "ready" position, and actuating a switch at the other end of travel for signaling a completion of the coded data transfer. The reader unit is electrically connected to the input of a computer-controlled printer to thereby cause printing of the data as read from the insert key.

Several modifications of the instant invention include the use of slots and spring-loaded pins for actuating switches, or the use of bar magnets and proximity switches or reluctance head pickups in various arrangements.

In accordance with the above discussion, the principal object of the present invention is to provide for automatically programming a computer controlled printer to print the proper base multiple (e.g. the price per pound of a selected commodity).

Another object of the present invention is to provide a price setting key and a readout unit wherein the date is in human readable characters, and also in corresponding decimal coded language for transfer to the computer controller.

An additional object of the present invention is to provide a price setting key and a readout unit with permissive means to prevent errors in operation.

A further object of the present invention is to provide a price setting key and a readout unit wherein the key accords ease of change in the base multiple data compatible with the ability of the readout unit to transfer such data.

Additional advantage and features of the present invention will become apparent and fully understood from a reading of the following description taken together with the annexed drawings, in which.

Figure 1:
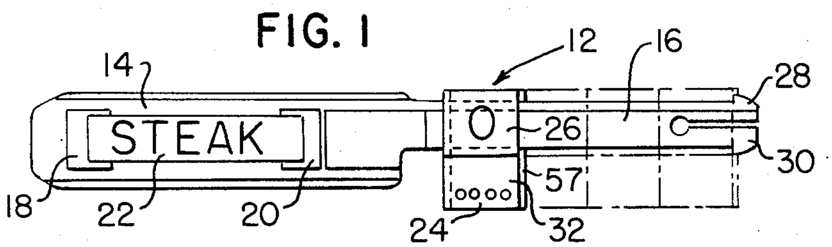
FIG. 1 is a plan view of the price setting key with one pricing tab thereon.
Figure 2:
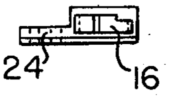
FIG. 2 is an end view of the key shown in FIG. 1.
Figure 6:
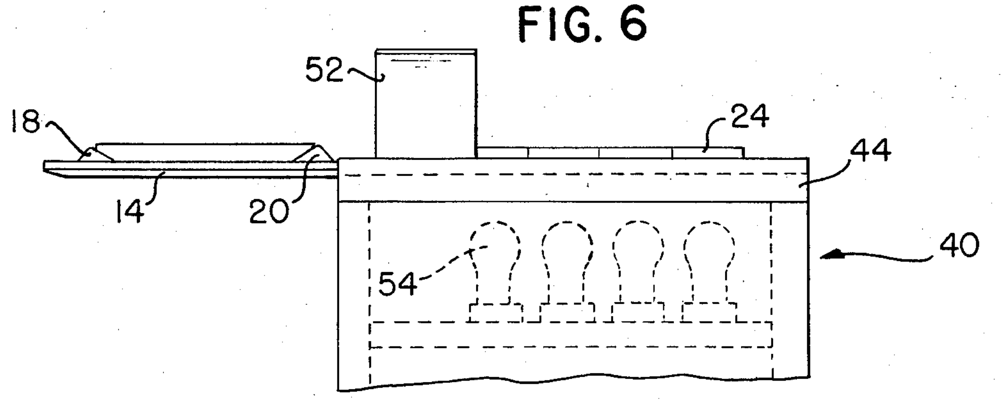
FIG. 6 is a front view of the reader showing the read head in position over the price setting key.

As illustrated in FIG. 1, a combined commodity name and price setting key 12 comprises a handle portion 14 and a reading portion 16, the handle portion having a pair of uprights 18 and 20 (see FIG. 6) to form a seat for a commodity name plate 22 placed between the uprights to be retained on the handle. The plate 22 may, in some cases, be permanently secured to the handle portion 14 so as to be used specifically for one commodity name, such as "steak", for a length of time, and then the key would be discarded. The reading portion 16 of the key 12 is a reduced sectional part (see the end view in FIG. 2) and keyed to cooperate with a plurality of tabs 24 slidable over the reading portion. FIG. 1 shows a tab 24 in the leftward position and three more tabs, in outline form, adjacent thereto.

Figure 3:
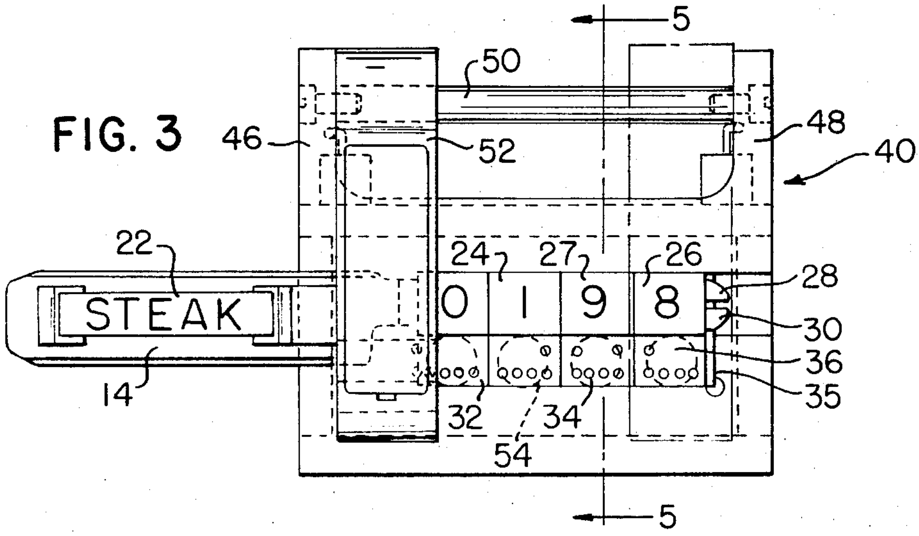
FIG. 3 is a top view of the reader unit with the price setting key inserted in position for reading.

Each tab is a plastic molded part having a numeral surface 26 (FIG. 3) on which are inscribed human readable characters or numerals 27 which denote the price per pound of the specific commodity. The reading portion 16 of the key 12 includes at the right hand end thereof a bifurcated construction wherein a kerf line provides separate fingers 28, 30 to effect locking of the tabs in place when four of these tabs are inserted over the read portion of the key. A spring action of the fingers 28, 30 provides for easy insertion and removal of the tabs. Even though the price per pound of a commodity may require only two or three tabs for the price numerals, the remaining tab or tabs could display a zero, as shown in FIG. 3, or could indicate two pounds for a certain price, e.g. 2389 would be two pounds for $3.89. In this manner, the person who was inserting the tabs over the key, of course, would be knowledgeable in the pricing structure so as to use the correct tabs in setting up for the printing operation.

In addition to the numeral bearing surface 26, each tab 24 has a read section 32 alongside the surface 26, the read section providing apertures 34 therein in the nature of two rows of holes. One row of holes 35 is for clock-pulse generation and the other row of holes 36 is a data code corresponding to the value of the numerals on surface 26 in binary coded relationship to be read in the 1–2–4–8 decimal system. It is thus seen that the tabs 24 include the human readable characters 27 and also the machine readable apertures 34 so that the operator inserts the proper pricing key 12 into the reader for transferring the pricing data for correct printing of the price per pound.

A reader, generally designated 40, includes an enclosure 42 having typical front, rear, and side walls, and a top plate 44, (shown in plan in FIG. 4 and in section in FIG. 5), which is constructed to receive the pricing key 12 in a position to be read, such top plate 44 having a recess of irregular outline corresponding to the outline of the reading portion of the key. A pair of rearwardly extending arms 46, 48 carry a rod-like shaft 50, on which shaft rides a read head 52 pivotable on the shaft and extending across the top of the plate 44. The upper plate 44 has a window 53 of diffusing lens nature, disposed directly under the read surface 32 of the pricing key tabs, for transmitting light from a source 54, consisting of one lamp for each of the tabs 24. Each tab has an overlay portion 57 (FIG. 1) to prevent any light from passing between adjacent tabs. The read head 52 has one photodiode 55 for reading the apertures in row 35, the diode picking up the pulses of the light emitting through the sixteen apertures from the light source 54. A second photodiode 56, spaced from diode 55 and directly over the data code row 36 of holes 34, picks up the pulses of the light emitting through the apertures, the pulses being in binary code and corresponding to the value of the characters according to the selected prices.

Figure 4:
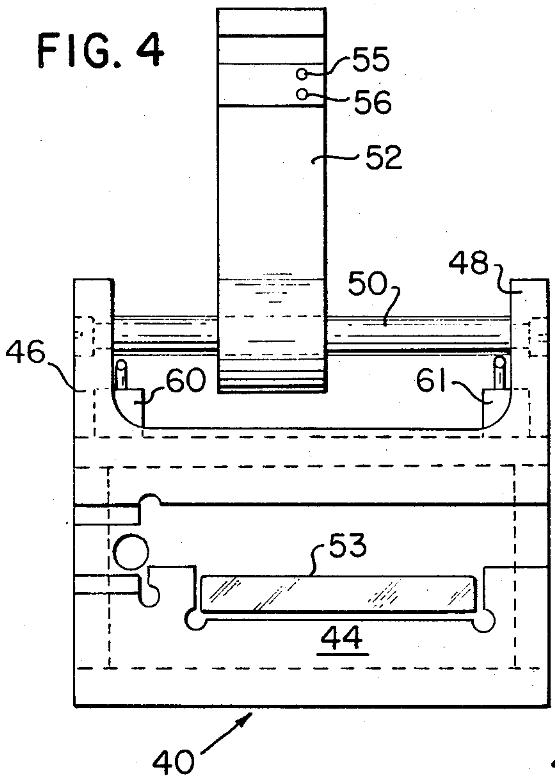
FIG. 4 is a top plan view of the reader minus the price setting key and with the slide head in retracted position.

A "ready" switch 60, having a swingable action lever, is positioned near the left end of the shaft 50 and supported from the rear wall of enclosure 42 so that upon moving of the read head 52 to the left from the position thereof shown in FIG. 4, the switch will be actuated to indicate that a code transfer of pulses is to begin. A "complete" switch 61 is located near the right end of the shaft and supported from the rear wall of enclosure 42 so that upon moving the read head toward the right, the switch will be actuated to indicate that the code transmission has been completed. These signals are transmitted to the computer-controller in sequential manner and acted thereon accordingly.

Figure 7:
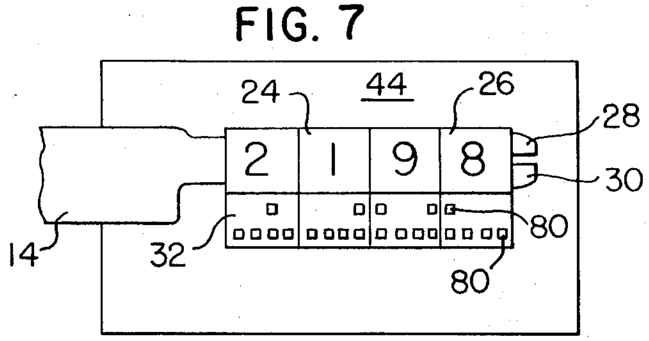
FIGS. 7–13 are schematic representations of various modifications of the key and readout unit of the instant invention.

FIGS. 7–13 show various modifications of the pricing key and the reader unit which enable flexibility in the practice of the invention. FIG. 7 shows a construction similar to the preferred embodiment except that small bar magnets 80 are embedded in the read section 32 of the tabs 24, the magnets taking the place of the rows 35, 36 of apertures 34 and corresponding to the selected characters in one row and to the clock-pulse generation in the other row. In this case, the read head carries proximity switches or reluctance head pickups to sense the positions of the magnets and thereby send the pulses to the computer-controller.

Figure 8:
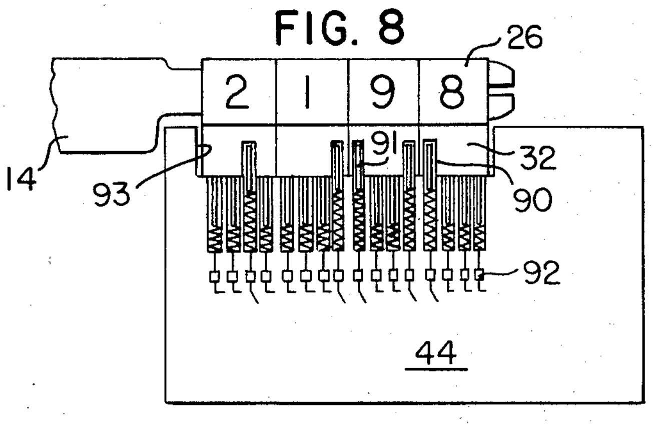

In FIG. 8 the tabs 24 have slots 90 positioned to be corresponding in binary code to the characters on surface 26 and the reader has sixteen spring loaded pins 91 which permit actuation of a related switch 92 whenever any of the pins sense a slot 90. The reader 40 has a slot 93 constructed to receive the read section 32 of the tabs 26 and upon insertion of the tabs (in a sidewise direction) into the slot 93, the pins 91 which enter a slot allow the springs to extend and thereby actuate the related switch 92 to indicate the proper character to be printed. In this construction, a "ready" switch and a "complete" switch are actuated upon insertion and withdrawal of the insert key into one from the slot 93 of the reader unit.

Figure 9:
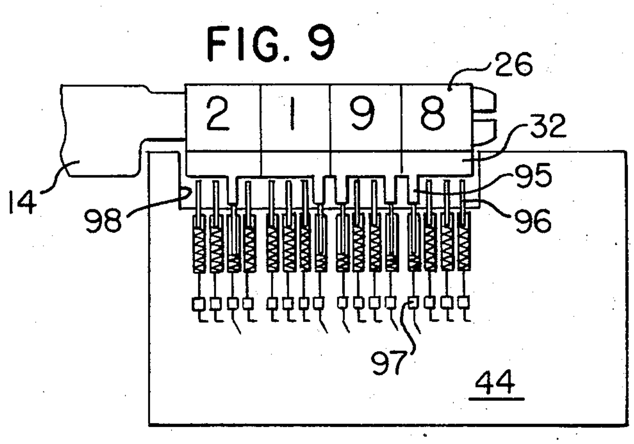

FIG. 9 features the reverse action of the concept from that shown in FIG. 8. The tabs 24 have fingers 95 in the positions corresponding in binary code to the characters on surface 26 and the reader has sixteen spring loaded pins 96 which cause actuation of a related switch 97 whenever any of the fingers depress the pin and the spring. The reader has a slot 98 constructed to receive the read portion 32 of the tabs and upon insertion of the tabs (in a sidewise direction) into the slot 98, the fingers 95 depress the pins 96 and thereby actuate the related switch 97 to indicate the proper character to be printed.

Figure 10:
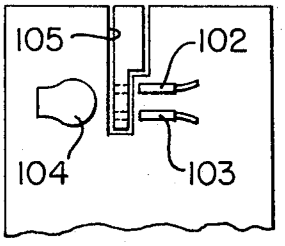

Another modification is shown in FIG. 10, wherein the reader has two photodiodes 102, 103 and a lamp 104 bridging a key shaped slot 105. The key is inserted from the top of the reader thereby actuating a "ready" switch and the key is pulled or drawn lengthwise for reading of the light emitting through the apertures as the tabs are moved past the lamp and diode path.

Figure 11:
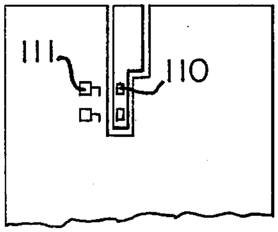

FIG. 11 shows a variation of FIG. 10 wherein bar magnets 110 are embedded in the read section of the tabs and proximity switches 111 are supported in the reader adjacent the key slot to initiate the pulses as the key is drawn through the slot in a lengthwise direction.

Figure 12:
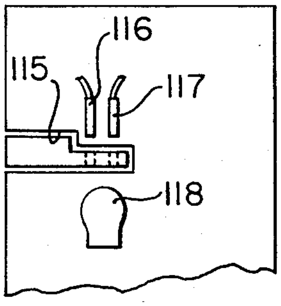

A further modification is shown in FIG. 12 wherein a key slot 115 is provided in the reader and two photodiodes 116, 117 and a lamp 118 bridge the slot and wherein the key read portion is inserted at one end of the slot 115 and pushed in one direction to actuate a "ready" switch and then is pulled in the opposite direction to read the data and to actuate a "complete" switch at the end of the reading.

Figure 13:
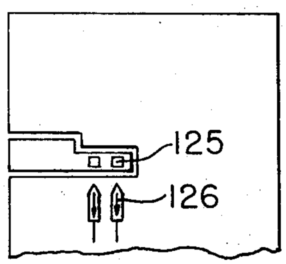

FIG. 13 is similar to FIG. 12 except for the use of bar magnets 125 and reluctance head pickups 126.

Figure 14:
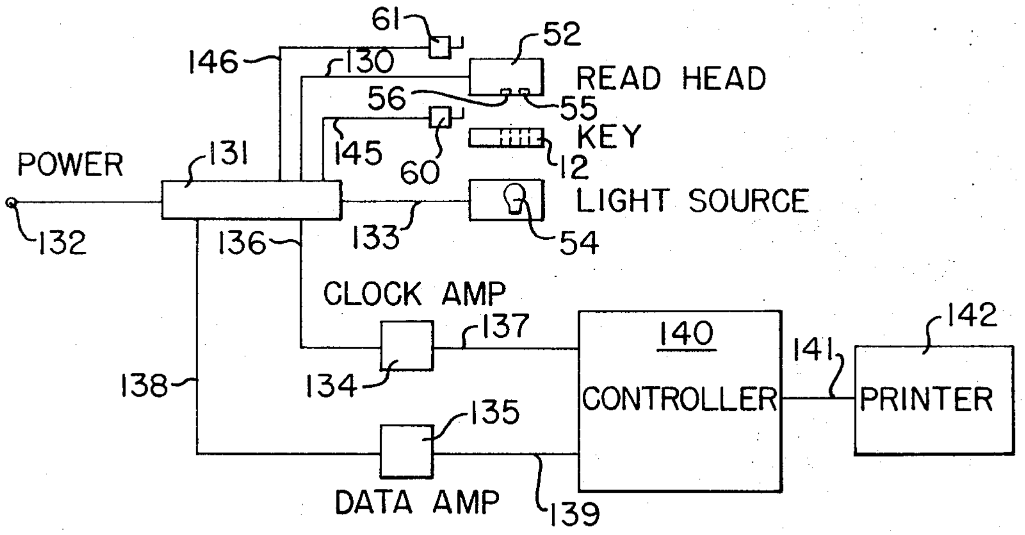
FIG. 14 is a schematic diagram of the price setting key with apertures therein and the read head with photodiodes for transferring the information to the computer controlled printer.

A simplified schematic diagram of the major components of the system is shown in FIG. 14, wherein a cable 130 is connected to the read head photodiodes 55, 56 and to a terminal block 131, which block receives an electrical supply through a cable 132 and which supply is carried to the light source 54 by a cable 133. A clock pulse amplifier 134 and a data pulse amplifier 135 are connected in the circuits, by means of cables 136, 137, 138 and 139, leading from the read unit terminal 131 to the computer-controller 140 and a connection 141 is made from the controller to the printer 142. Additionally, cables 145 and 146 are connected to the terminal 131 and extend to the "ready" switch 60 and to the "complete" switch 61. Of course, the cables connecting the terminal 131 and the controller 140 include extension of the circuits from these switches and also the circuits from the read head 52.

Figure 5:
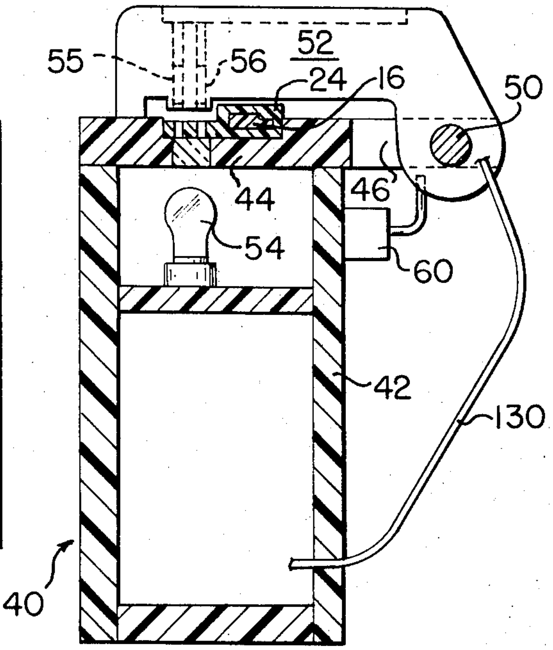
FIG. 5 is a sectional view taken on the line 5—5 of FIG. 3.

In the operation of the preferred embodiment, the proper pricing key 12 is selected and such preprogrammed key is inserted into or set in the reader, with the read head positioned as shown in FIG. 4. The slide head 52 is moved manually to one end of the shaft 50 or to the left in FIG. 4, which movement actuates the "ready" switch 60 to indicate that the code transfer is going to begin. The head 52 is swung on the shaft to a reading position (see FIG. 3) and then is moved to the right wherein the outer end of the head rides along the top surface of the plate 44 (FIG. 5). The pulses are picked up by the photodiodes 55, 56, they are amplified, and then transmitted to the computer-controller to be ready for the printing operation. When the right hand limit is reached, the "complete" switch 61 is actuated to indicate that the code transmission has been completed which, in effect, also verifies that the sixteen clock pulses were transmitted. When both of these conditions are positive, the price code data is received and acted upon in the computer-controller and these signals are then transmitted to the printer for printing the price on the commodity label. This error detect system will prevent the operator from sliding the read head 52 in the wrong direction and will also assure that there was no reversing of the head during travel. Another feature of the present inventive concept is that speed of travel of the slide head 52 does not affect operation of the reading.

It is thus seen that herein shown and described is an improved programmable price setting key and a method for transferring the price to a computer-controlled printer, wherein the price setting key includes both human readable characters and machine readable indicators thereon. The apparatus enables the accomplishment of the objects and advantages mentioned above, and while several modifications of the invention have been disclosed herein, other variations may occur to those skilled in the art. It is contemplated that all such variations, not departing from the spirit and scope of the invention hereof, are to be construed in accordance with the following claims.

What is claimed is:

1. Apparatus for transferring selected commodity pricing information comprising a
   commodity pricing key having a reading portion, a
   plurality of tabs slidable onto the reading portion, said tabs including a first section having human readable characters thereon for selection of desired prices to be transferred and a second section adjacent the first section and having machine readable indicators therein corresponding to said human readable characters, and
   means for reading the machine readable indicators, said reading means including means movable across the plurality of tabs for observing the positions of the machine readable indicators and for transmitting pulses corresponding to said positions in a cycle along one direction of travel of the movable means.

2. The apparatus of claim 1 wherein the machine readable indicators comprise a plurality of apertures in the tabs and spaced in binary coded relationship with the human readable characters, the reading means includes a light source, and the movable means includes photosensitive elements for detecting light emitting through the apertures.

3. The apparatus of claim 1 wherein the machine readable indicators comprise a plurality of magnets embedded in the tabs and spaced in binary coded relationship with the human readable characters, and the reading means include elements actuated by the magnets for transmitting said pulses.

4. The apparatus of claim 1 wherein the machine readable indicators comprise a plurality of slots in the tabs and spaced in binary coded relationship with the human readable characters, and the reading means include spring-loaded elements actuated by sensing of the slots for transmitting said pulses.

5. In commodity pricing apparatus, means for transferring the price of a commodity from said apparatus to a computer-controlled printer, said means comprising a
   commodity pricing key having a plurality of tabs with human readable numerals and machine readable indicators thereon, each of said tabs being slidable onto the pricing key,
   means for locking the tabs in position of the key, and
   means for reading the machine readable indicators, said reading means including means movable across the plurality of tabs for observing the positions of the indicators and for transmitting pulses to the computer in binary code corresponding to said positions in a cycle along one direction of travel of the movable means.

6. In the apparatus of claim 5 wherein the machine readable indicators comprise a plurality of apertures in the tabs and spaced in binary coded relationship with the human readable numerals, the reading means includes a light source, and the movable means includes photosensitive elements for detecting light emitting through the apertures.

7. In the apparatus of claim 5 wherein the machine readable indicators comprise a plurality of magnets embedded in the tabs and spaced in binary coded relationship with the human readable numerals, and the reading means include elements actuated by the magnets for transmitting said pulses.

8. In the apparatus of claim 5 wherein the machine readable indicators comprise a plurality of slots in the tabs and spaced in binary coded relationship with the human readable characters, and the reading means include spring-loaded elements actuated by sensing of the slots for tarnsmitting said pulses.

9. Apparatus for transferring selected commodity pricing information comprising a commodity pricing key having a reading portion and movable in at least one direction of travel, a plurality of tabs slidable onto the reading portion, said tabs including a first section having human readable characters thereon for selection of desired prices to be transferred and a second section adjacent the first section and having machine readable indicators therein corresponding to said human readable characters, and means for reading the machine readable indicators, said reading means including means for observing the positions of the machine readable indicators and for transmitting pulses corresponding to said positions in a cycle along one direction of travel of the pricing key.

10. The apparatus of claim 9 wherein the machine readable indicators comprise a plurality of apertures in the tabs and spaced in binary coded relationship with the human readable characters, the reading means includes a light source, and the means for observing includes photosensitive elements for detecting light emitting through the apertures.

11. The apparatus of claim 9 wherein the machine readable indicators comprise a plurality of magnets embedded in the tabs and spaced in binary coded relationship with the human readable characters, and the reading means include elements actuated by the magnets for transmitting said pulses.

12. The apparatus of claim 9 wherein the machine readable indicators comprise a plurality of slots in the tabs and spaced in binary coded relationship with the human readable characters, and the reading means include spring-loaded elements actuated by sensing of the slots for transmitting said pulses.

13. In commodity pricing apparatus, means for transferring the price of a commodity from said apparatus to a computer-controlled printer, said means comprising a commodity pricing key having a plurality of tabs with human readable numerals and machine readable indicators thereon, each of said tabs being slidable onto the pricing key, said pricing key being movable in at least one direction of travel, means for locking the tabs in position on the key, and means for reading the machine readable indicators, said reading means including means for observing the positions of the indicators and for transmitting pulses to the computer in binary code corresponding to said positions in a cycle along one direction of travel of the pricing key.

14. In the apparatus of claim 13 wherein the machine readable indicators comprise a plurality of apertures in the tabs and spaced in binary coded relationship with the human readable numerals, the reading means includes a light source, and the means for observing includes photosensitive elements for detecting light emitting through the apertures.

15. In the apparatus of claim 13 wherein the machine readable indicators comprise a plurality of magnets embedded in the tabs and spaced in binary coded relationship with the human readable numerals, and the reading means include elements actuated by the magnets for transmitting said pulses.

16. In the apparatus of claim 13 wherein the machine readable indicators comprise a plurality of slots in the tabs and spaced in binary coded relationship with the human readable characters, and the reading means include spring-loaded elements actuated by sensing of the slots for transmitting said pulses.

17. Apparatus for transferring selected commodity pricing information comprising a commodity pricing key having a reading portion, a plurality of tabs slidable onto the reading portion, said tabs including a first section having human readable characters thereon for selection of desired prices to be transferred and a second section adjacent the first section and having machine readable indicators therein corresponding to said human readable characters, and means for reading the machine readable indicators, said reading means including means spanning the plurality of tabs for observing the positions of the machine readable indicators and for transmitting pulses corresponding to said positions along the tabs.

18. The apparatus of claim 17 wherein the machine readable indicators comprise a plurality of apertures in the tabs and spaced in binary coded relationship with the human readable characters, the reading means includes a light source, and the means for observing includes photosensitive elements for detecting light emitting through the apertures.

19. The apparatus of claim 17 wherein the machine readable indicators comprise a plurality of magnets embedded in the tabs and spaced in binary coded relationship with the human readable characters, and the reading means include elements actuated by the magnets for transmitting said pulses.

20. The apparatus of claim 17 wherein the machine readable indicators comprise a plurality of slots in the tabs and spaced in binary coded relationship with the human readable characters, and the reading means include spring-loaded elements actuated by sensing of the slots for transmitting said pulses.

21. In commodity pricing apparatus, means for transferring the price of a commodity from said apparatus to a computer-controlled printer, said means comprising a commodity pricing key having a plurality of tabs with human readable numerals and machine readable indicators thereon, each of said tabs being slidable onto the pricing key, means for locking the tabs in position on the key, and means for reading the machine readable indicators, said reading means including means spanning the plurality of tabs for observing the positions of the indicators and for transmitting pulses to the computer in binary code corresponding to said positions along the tabs.

22. In the apparatus of claim 21 wherein the machine readable indicators comprise a plurality of apertures in the tabs and spaced in binary coded relationship with the human readable numerals, the reading means includes a light source, and the means for observing includes photosensitive elements for detecting light emitting through the apertures.

23. In the apparatus of claim 21 wherein the machine readable indicators comprise a plurality of magnets embedded in the tabs and spaced in binary coded relationship with the human readable numerals, and the reading means include elements actuated by the magnets for transmitting said pulses.

24. In the apparatus of claim 21 wherein the machine readable indicators comprise a plurality of slots in the tabs and spaced in binary coded relationship with the human readable characters, and the reading means include spring-loaded elements actuated by sensing of the slots for transmitting said pulses.

* * * * *